United States Patent Office 3,259,639
Patented July 5, 1966

3,259,639
PROCESS OF MAKING FLUOROPHENOLS AND
THE INTERMEDIATES THEREFOR
David Taub, Metuchen, N.J., assignor to Merck & Co.,
Inc., Rahway, N.J., a corporation of New Jersey
No Drawing. Filed Jan. 22, 1962, Ser. No. 167,928
6 Claims. (Cl. 260—396)

This invention relates generally to a new method for making fluorophenols and to the new substances thus obtained. More particularly, it is concerned with the synthesis of ortho and para fluorophenols from phenolic compounds which contain no halogen or which contain a halogen atom other than fluorine. Still more specifically, it relates to a method for introducing fluorine into a phenolic compound by treatment of said compound with perchloryl fluoride.

Fluorine-containing phenols are highly important chemical compounds because they are key intermediates in the synthesis of the fluoro analogs of many naturally occurring complex organic substances, a specific instance being the utilization of 2-fluoro-3,5-dimethoxyphenol in the chemical synthesis of the fluoro analog of the antifungal agent griseofulvin. Heretofore, convenient and feasible methods for obtaining fluorophenols have not been readily available. One object of the present invention is to provide a new and novel synthesis of fluorophenols. Another object is to provide a method of introducing fluorine into the nucleus of a phenol compound in high yield and by a process which has applicability to a large class of phenolic substances. Other objects will become apparent from the ensuing discussion of the invention.

According to the present invention, it has now been found that fluorophenols may be obtained by reacting a phenolic compound which lacks fluorine with perchlorylfluoride ($FClO_3$). The initial stage of this process comprises the formation of a cyclohexadiene-1-one which contains two atoms of halogen in the 4- or 6-position, and treatment of said cyclohexadiene-1-one with a reducing agent to produce the desired 2- or 4-fluorophenol. As applied to the synthesis of 2-fluoro and 4-fluoro-3,5-dimethoxyphenol, the process of this invention may be pictured structurally as follows:

(1)
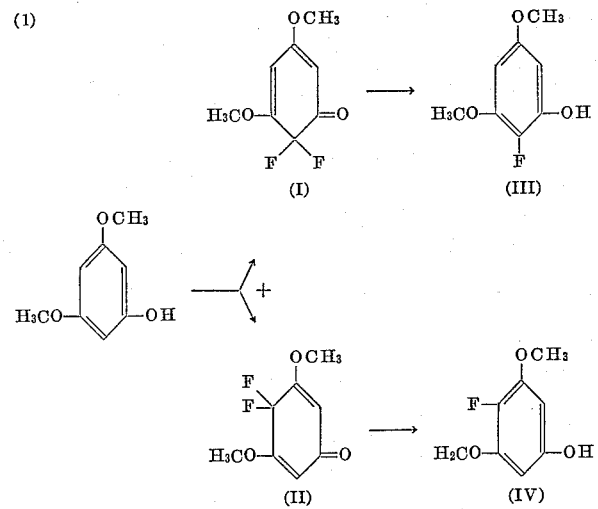

The first step of this process comprises treating or intimately contacting a solution of the phenol with perchlorylfluoride. This is accomplished by passing a slow stream of perchlorylfluoride gas through the reaction medium over a period of from about 10 to about 35 hours. The perchlorylfluoride is not highly soluble in most of the suitable reaction solvents so that optimum results are obtained by adding the fluorinating agent slowly over a rather lengthy period of time. The reaction temperature is not unduly critical and it has been found convenient to carry out the process at about room temperature.

As the reaction medium it is preferred to employ mildly basic solvents such as pyridine, dimethylformamide, a picoline, a lutidine or a mixture of solvents, typical examples of which are aqueous dioxane and an inorganic base such as sodium hydroxide, sodium carbonate or potassium carbonate. It appears that optimum results are obtained when the phenolate anion exists in the reaction medium. This occurs under basic conditions, and it is for this reason that mildly basic solvents are preferred. Although I do not wish to be bound by theories as to reaction mechanism, it appears likely that the first products which form temporarily in my process are ortho and para fluorophenols and that these are then covered almost immediately to the mixture of cyclohexadiene-1-ones pictured in the above flow diagram by Formulas I and II. The cyclohexadieneones are recovered as solids from the reaction mixture after acidification thereof and normally treated directly with a reducing agent to produce the desired 2- and 4-fluorophenols. Although it is possible to separate the mixture of cyclohexadieneones by fractional crystallization techniques, it is more convenient to treat the mixture with a reducing agent to give a mixture of ortho and para fluorophenols (Formulas III and IV) and to separate the two substances at this stage of the process. This is conveniently accomplished by taking advantage of the steam volatility of the o-fluoro compound and the steam non-volatility of the p-fluorophenol.

The conversion of the polyfluorinated cyclohexadieneones to the desired fluorophenols is accomplished by reacting the ketones with a metallic reducing agent such as zinc dust, chromous chloride, chromous acetate or with a reducing system such as sodium iodide in acetic acid.

When the starting phenols of my process contain in the ortho and para positions a halogen other than fluorine, o- and p-fluorophenols are also produced. However, in addition to a phenol in which the halogen atom of the starting material has been replaced by fluorine, there is also produced a phenol wherein the halogen atom originally present is retained and an atom of fluorine introduced into an ortho or para position of the phenol. For example, when 2-chloro-3,5-dimethoxyphenol is reacted with perchlorylfluoride according to the process described above, and the resulting mixture of cyclohexadiene-1-ones treated with a reducing agent such as zinc dust, the two products obtained are 2-fluoro-3,5-dimethoxyphenol and 2-chloro-6-fluoro-3,5-dimethoxyphenol. As a further illustration, when 4-chloro-3,5-dimethoxyphenol is treated according to the process described herein, 4-fluoro-3,5-dimethoxyphenol and 2-fluoro-4-chloro-3,5-dimethoxyphenol are obtained as the final products after reduction of the cyclohexadieneones. These processes may be represented structurally as:

(2)
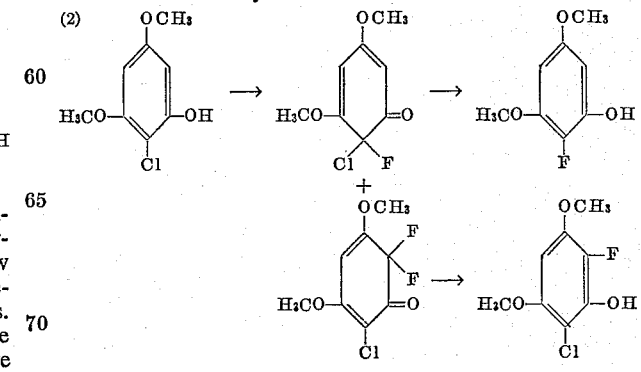

(3) 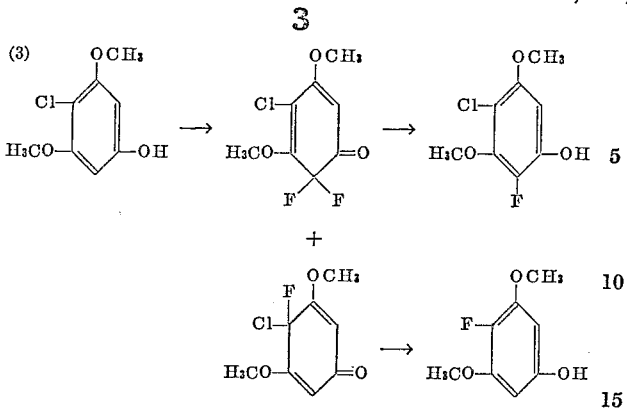

The process of this invention is not limited to any particular group of phenols although the end result of the process is that fluorine is introduced in the ortho and/or para positions of the molecule so that either or both of these positions in the starting material should be unsubstituted or substituted with a halogen atom which may in turn be replaced by fluorine. Phenols which may be employed as starting materials in this process for the preparation of fluorophenol are those which give a precipitate in dilute aqueous solution on treatment with bromine or which give evolution of hydrogen bromide on treatment with bromine in carbon tetrachloride. Details for carrying out these tests may be found in "Qualitative Organic Analyses," Kamm, John Wiley & Sons, Second Edition, 1932, 62–63. Typical examples of suitable phenols are those wherein the 3 and/or 5 positions of the molecule are unsubstituted, or are substituted with lower alkyl or lower alkoxy groups.

The following examples are given for the purpose of illustration and not by way of limitation:

*Example 1.—2-fluoro-3,5-dimethoxyphenol; 4-fluoro-3,5-dimethoxyphenol*

A solution of 50 g. of phloroglucinol dimethyl ether in 400 ml. of pyridine is flushed with nitrogen by passing a stream of nitrogen through the solution for 5 minutes. The solution is then chilled to about 5° C. and perchloryl fluoride bubbled slowly through the solution. The mixture is allowed to warm to 25° C. and the slow addition of perchloryl fluoride (about one bubble per second) continued for 28 hours. The reaction mixture is then flushed with nitrogen and concentrated in vacuo to a syrup. 200 ml. of water is added to the syrup followed by sufficient cold 2.5 N hydrochloric acid to make the mixture acidic. The resulting yellow precipitate is recovered by filtration, washed with water and air dried. It consists essentially of a 1:1 mixture of $\Delta^{2,4}$-6,6-difluoro-3,5-dimethoxy-cyclohexadiene-1-one and $\Delta^{2,5}$-4,4-difluoro-3,5-dimethoxy-cyclohexadiene-1-one, M.P. 80–115° C. These cyclohexadieneones are separated and obtained substantially pure by fractional crystallization from ether and finally from an acetone-ether mixture. The $\Delta^{2,5}$-cyclohexadieneone is less soluble than the $\Delta^{2,4}$-cyclohexadieneone. After purification by crystallization from ether and acetone-ether $\Delta^{2,4}$-6,6 - difluoro - 3,5 - dimethoxy - cyclohexadiene - 1 - one has M.P. 105–107° C., and $\Delta^{2,5}$-4,4-difluoro-3,5-dimethoxy - cyclohexadiene - 1 - one has M.P. 146–48° C.

29 g. of the 1:1 mixture of cyclohexadieneones obtained as described in the preceding paragraph is added to 150 ml. of acetic acid. The solution is chilled to 10° C. and 30 g. of zinc dust added to it. The resulting mixture is stirred vigorously for 1 hour at 10–15° C. and then filtered. The solids are washed with 30 ml. of ether and 30 ml. of water, and the washings added to the filtrate. The filtrate is extracted with 3 x 100 ml. of ether. The ether extracts are combined, washed with cold dilute sodium hydroxide solution, acidified with dilute hydrochloric acid, extracted with ether and the latter extract dried over magnesium sulfate. The drying agent is then removed by filtration and the ether solution concentrated to dryness in vacuo to give 26 g. of a red oil. This oil is steam distilled and the distillate (about 15 liters) treated with sodium chloride and extracted with 3×5 liters of ether. The ether extracts are combined and concentrated to dryness to give about 12 g. of a pale yellow oil. This oil is crystallized from ether-petroleum ether to give substantially pure 2-fluoro-3,5-dimethoxyphenol, M.P. 68–70° C. The non-volatile residue from the steam distillation crystallizes slowly upon standing in the cold to give substantially pure 4-fluoro-3,5-dimethoxyphenol, M.P. 70–73° C.

*Example 2.—2-fluoro-3,5-dimethoxyphenol; 2-chloro-6-fluoro-3,5-dimethoxyphenol*

60 g. of 2-chloro-3,5-dimethoxyphenol in 500 ml. of pyridine is flushed with nitrogen and the resulting solution cooled to about 5° C. Perchlorylfluoride gas is slowly bubbled through this solution (about 1 bubble/second) for 28 hours during which time the reaction mixture is allowed to warm to room temperature. At the end of this time the reaction mass is again flushed with nitrogen and concentrated to a syrup in vacuo. 220 ml. of water is added and the resulting mixture acidified with cold 2.5 N hydrochloric acid. The resulting solid is removed by filtration, washed with water and air dried to give a mixture of $\Delta^{2,4}$-6-chloro-6-fluoro-3,5-dimethoxycyclohexadiene-1-one and $\Delta^{3,5}$-2,2-difluoro-6-chloro-3,5-dimethoxycyclohexadiene-1-one. Fractional crystallization from ether and subsequently from a mixture of acetone-ether yields $\Delta^{2,4}$ - 6 - chloro-6-fluoro-3,5-dimethoxycyclohexadiene-1-one, M.P. 100–102° C. as the less soluble product, and $\Delta^{3,5}$ - 2,2-difluoro-6-chloro-3,5-dimethoxycyclohexadiene-1-one, M.P. 197–199° C. as the more soluble product.

To separate solutions containing 5 g. of each of these products in 30 ml. of acetic acid there is added 5 g. of zinc dust and the resulting mixtures stirred for 90 minutes at 15° C. The solids are then removed from each of the reaction mixtures by filtration and the resulting solutions treated separately as follows:

The filtrate is extracted with 3 x 10 ml. of ether and the ether extracts then combined, washed with dilute aqueous sodium hydroxide solution acidified with dilute hydrochloric acid, extracted with ether and the latter extract dried over magnesium sulfate. The ether is removed by distillation to give a residual oil which on trituration with ether yields crystals. From $\Delta^{2,4}$-6-chloro-6-fluoro-3,5-dimethoxy-cyclohexadiene-1-one there is obtained substantially pure 2-fluoro-3,5-dimethoxyphenol, and from $\Delta^{3,5}$-2,2-difluoro-6-chloro-3,5-dimethoxy-cyclohexadiene-1-one there is obtained 2-chloro-6-fluoro-3,5-dimethoxyphenol.

*Example 3.—2-fluoro-4-chloro-3,5-dimethoxyphenol; 4-fluoro-3,5-dimethoxyphenol*

When 4-chloro-3,5-dimethoxyphenol is treated with perchlorylfluoride as described in Example 1 above, there is obtained a mixture of $\Delta^{2,4}$-4-chloro-6,6-difluoro-3,5-dimethoxy - cyclohexadiene - 1 - one and $\Delta^{2,5}$-4-chloro-4-fluoro - 3,5-dimethoxy-cyclohexadiene-1-one. Separation of this mixture by fractional crystallization and treatment of the separated products with zinc as described in Example 2 yields 2-fluoro-4-chloro-3,5-dimethoxyphenol from $\Delta^{2,4}$ - 4 - chloro-6,6-difluoro-3,5-dimethoxy cyclohexadiene-1-one and 4-fluoro-3,5-dimethoxyphenol from $\Delta^{2,5}$-4-chloro-4-fluoro-3,5-dimethoxy - cyclohexadiene - 1-one.

Any departure from the above description which conforms to the present invention is intended to be included within the scope of the claims.

What is claimed is:
1. The process for preparing phenols of the formula

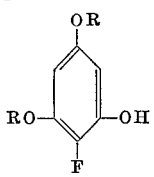

where R represents lower alkyl, that comprises treating a phenol of the formula

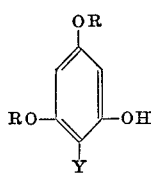

where R is as defined above and Y is selected from the group consisting of hydrogen and chlorine with perchloryl fluoride and treating the resulting product with a metallic reducing agent.

2. The process of preparing 2-fluoro-3,5-diloweralkoxyphenol that comprises treating 3,5-diloweralkoxyphenol with perchlorylfluoride to form $\Delta^{2,4}$-6,6-difluoro-3,5-diloweralkoxy-cyclohexadiene-1-one, and reacting said latter substance with a metallic reducing agent.

3. The process for preparing 2-fluoro-3,5-dimethoxyphenol that comprises intimately contacting 3,5-dimethoxyphenol with perchlorylfluoride to form $\Delta^{2,4}$-6,6-difluoro-3,5-dimethoxy-cyclohexadiene-1-one, and reacting said latter substance with zinc-acetic acid.

4. The process for producing 2-fluoro-3,5-dimethoxyphenol that comprises intimately contacting 2-chloro-3,5-dimethoxyphenol with perchlorylfluoride to produce $\Delta^{2,4}$-6-fluoro-6-chloro-cyclohexadiene-1-one, and reacting said latter substance with zinc in acetic acid.

5. $\Delta^{2,4}$-6,6-difluoro - 3,5 - diloweralkoxycyclohexadiene-1-one.

6. $\Delta^{2,4}$ - 6,6 - difluoro-3,5-dimethoxy-cyclohexadiene-1-one.

References Cited by the Examiner

UNITED STATES PATENTS 2,750,427   6/1956   Gaertner _____ 260—623

OTHER REFERENCES

Grove et al., J. Chem. Soc. (London), 1952, pp. 3967–77 (pp. 3968 and 3974 relied upon).

Nakanishi et al., J. Am. Chem. Soc., vol. 81, pp. 5259–60 (1959).

Mills et al., J. Am. Chem. Soc., vol. 82, pp. 5882–9 (1960).

Kende et al., J. Am. Chem. Soc., vol. 83, pp. 4197–4204 (1961).

References Cited by the Applicant

J. MacMillan, J. Chem. Soc., 2585 (1954).

Day et al., "The Total Synthesis of Griseofulvin," Proceedings of the Chemical Society, to 284 (1960).

LORRAINE A. WEINBERGER, *Primary Examiner.*

LEON ZITVER, D. D. HORWITZ, *Examiners.*

D. P. CLARKE, L. A. THAXTON, *Assistant Examiners.*